United States Patent Office 2,939,848
Patented June 7, 1960

2,939,848

HIGH-STRENGTH ALUMINA PELLETS

Russell V. Malo, Munster, and Harry M. Brennan, Hammond, Ind., assignors to Standard Oil Company, Chicago, Ill., a corporation of Indiana No Drawing. Filed June 20, 1957, Ser. No. 667,027

8 Claims. (Cl. 252—466)

Our invention relates to aggregates of alumina. More particularly, it relates to a method for producing particulate alumina having superior mechanical strength.

One of the important requirements of pelleted catalysts for use in fixed-bed catalytic operations is that the catalyst support be of sufficient strength to support its own weight and to withstand the attritional effects of vibration, process-stream turbulence, transient bed-lifting, impingement of other solid particles, and similar disturbances ordinarily encountered in fixed-bed processes. Failure to satisfy these requirements is a frequent source of difficulty with various types of catalysts, and gradual loss of mechanical strength during use is a common occurrence, for example, in the case of molybdena-alumina or platinum-alumina hydroforming catalysts, necessitating the discard of catalyst which in other respects would continue to be entirely satisfactory. Additional losses also occur during loading and/or screening operations. Aside from loss of catalyst per se, the resulting broken or powdered alumina may tend to clog catalyst beds and give rise to pressure drop difficulties. It is therefore an object of our invention to produce an alumina aggregate of improved mechanical strength and stability, especially adapted for use as a catalyst, per se, or for use as a supporting material for other types of catalytic substances.

One phase of alumina which is advantageously used as a catalyst, per se, or as a supporting material is gamma alumina. We have discovered a simple and inexpensive method for greatly improving the physical strength, i.e., crushing strength and attrition resistance, of calcined gamma alumina. In accordance with our invention we immerse calcined gamma alumina aggregates in an alkaline substance having a pH in the range of about 8–12 and an ionization constant less than about $10^{-2}$ at 25° C., e.g., aqueous ammonium hydroxide, for a period in excess of about 0.5 hour, e.g., 1–24 hours, at a temperature in excess of about 150° F., and thereafter calcine the treated pellets at a temperature between about 600 and 1400° F. for at least about 0.5 hour, preferably 1 to 24 hours. By such treatment crushing strength is more than doubled.

An important feature of our method is its application to calcined alumina, which, for purposes of the present invention, is defined as alumina which contains no more than about 1 mol of combined water per mole of alumina. The alumina should thus contain no more than about 18 percent by weight of combined water, preferably between about 1 and 18 percent, optimally between about 2 and 10 percent. To reduce the combined-water content of the alumina to the desired level of below about 18 percent by weight, the alumina may be calcined at a temperature in the range of about 600 to 1400° F. for a period in excess of about one half hour, e.g., about 1 to 24 hours, preferably about 1000 to 1100° F. for about 2 to 4 hours.

Another important feature is its application to composites which are predominately gamma alumina, i.e., more than about 75 percent gamma alumina. Gamma alumina is normally formed by the heat decomposition of alpha alumina monohydrate or of alpha or beta alumina trihydrate to alpha alumina monohydrate and then to gamma alumina (see "Alumina Properties," Technical Paper No. 10, revised, by Allan S. Russell et al., copyright 1956, Aluminum Company of America, at page 34). Thus, gamma alumina may be prepared by drying alumina gels or sols, specifically alumina hydrogels, hydrosols, ultragels, or the like. For example, alumina hydrogel is precipitated from an aluminum salt solution by addition of alkali, and is thereafter washed to remove impurities therefrom, and dried. As another example, a Heard-type alumina hydrosol, prepared as described in Reissue Patent 22,196 (October 6, 1942), is gelled and dried. Various other alternative techniques for producing gamma alumina will be apparent to those skilled in the art. In all cases, the product alumina is a solid, porous material which retains a small proportion of water, i.e., 1 to 18 percent, within the gel lattice and exhibits considerable surface activity.

Alumina phases, other than gamma alumina, are ineffective in the practice of our invention, i.e., no substantial increase in crushing strength (less than about 25 percent) is obtained. Such other phases which are frequently used as catalysts per se or as supports include chi and eta alumina. The gamma alumina used in the practice of my invention must also be substantially free of alpha alumina, i.e., less than about 0.5 percent by weight of alpha alumina. The gamma alumina may, however, contain small amounts of other catalytic elements, e.g., molybdena, chromia, platinum, nickel, and the like, provided that, as pointed out hereinabove, the resulting composite contains at least about 75 percent gamma alumina and is substantially free of alpha alumina. The composite may be freshly prepared or may be treated in accordance with our invention after use in the conversion of hydrocarbons. Used catalyst may, however, contain detectable amounts of alpha alumina. In such instances, our method may be less effective or may be totally ineffective, particularly if the alpha alumina content approaches about 0.5 percent by weight.

Our method is only applicable to preformed alumina, i.e., alumina which has already been formed into pills, pellets, spheres, saddles, rings, rosettes, irregular masses, or other shapes in which it is ultimately desired to be used. For convenience hereinafter, all such preformed aggregates shall be referred to as pellets. The alumina may be shaped by means of, for example, punches and/or extrusion techniques. Calcination of the preformed alumina prior to our treatment thus not only serves to reduce water content to the desired level but also may serve to remove any pelleting lubricants, e.g., stearic acid, rosin, Sterotex (a hydrogenated coconut oil), graphite, or the like.

The alkaline substance for use in treating the calcined gamma-alumina pellets must have a pH in the range of about 8 to 12 but also must have a limited ionization constant (i.e. less than about $10^{-2}$ at 25° C.) so as to prevent any substantial dissolving of the alumina and/or destruction of its catalytic properties. For this purpose, water soluble amines are preferred, optimally, aqueous ammonium hydroxide or an aqueous ammonium salt such as the carbonate, bicarbonate, or the like, which affords ammonium hydroxide under the treating conditions. Other aqueous solutions of organic amines can also be employed for this purpose, including water-soluble amines such as methylamine, dimethylamine, trimethylamine, ethylamines, isopropylamine, diisopropylamine, and furfurylamine. Quaternary ammonium hydroxides, however, should be avoided lest the alumina be attacked.

Aqueous treating solutions containing from about 1 to 30 percent NH₃ by weight are conveniently employed, although concentrated aqueous NH₃ solutions, e.g., 25–30 percent by weight of NH₃, are preferred to minimize the contact period. Temperature of contact must be in excess of about 150° F. and, preferably, above about 200° F., although, of course, the treating solution may be added at lower temperatures, e.g., ambient temperature, and later raised to the required contacting temperature. Higher temperatures also shorten the necessary contact period within the ranges specified and pressure is conveniently used to keep the NH₃ in solution as temperature is raised. Temperature, of course, should not exceed the critical temperature of water. Even with concentrated NH₃ solutions, and higher temperatures, however, a contact period of at least 0.5 hour is required, preferably about 2 to 5 hours.

The pellets must be completely surrounded by, i.e., immersed in, the treating solution. Mere wetting of the pellets under the prescribed conditions has been found to be ineffective. In general, depending, of course, on the particular shape of the preformed aggregates, about 0.5 to 5 volumes of treating solution per volume of alumina is sufficient. We have found it convenient to add about half again as much of the treating solution as is necessary to cover the alumina completely.

In a preferred embodiment of our invention we immerse calcined predominantly-gamma-alumina pellets which are substantially free of alpha alumina in aqueous concentrated NH₃ solution for about 2 to 5 hours at a temperature above about 200° F. and below the critical temperature of water, dry the immersed pellets at about 200 to 400° F. for about 1 to 24 hours, and calcine the dried pellets at about 600 to 1400° F. for about 1 to 24 hours.

Our invention will be more fully understood from the following specific examples.

*Example I*

Calcined gamma-alumina pellets were prepared from an alumina hydrosol of the Heard type, prepared as described in Reissue Patent 22,196 of October 6, 1942, to which was successively added a small amount of chloroplatinic acid and ammonium sulfide. Sufficient aqueous ammonium hydroxide was then introduced to cogel the mixture, following which it was dried at about 300° F. for about 16 hours, calcined at about 950° F. for about 3 hours, crushed, lubricated with Sterotex (a hydrogenated coconut oil) pelleted to form ⅛" x ⅛" pellets, and calcined for four hours at 1100° F. The resulting calcined gamma alumina contained about 0.6 weight percent platinum, 0.6 weight percent chloride, and about 4.3 weight percent volatiles (primarily as combined water).

A portion of the resulting ⅛" x ⅛" pellets were covered with concentrated aqueous NH₃ solution, containing about 25–30 percent by weight of NH₃, in an amount equivalent to about 50 percent more than just enough solution to cover the pellets. The immersed pellets were placed in an oven at about 225° F. for about 16 hours. The treated pellets were then calcined at about 1000° F. for about 2 hours. Crushing strength of about 25 of these treated pellets were then determined and compared with the crushing strength of about 25 of the untreated pellets. The results were as follows:

| | Avg. crushing strength of 25 pellets, pounds |
|---|---|
| Untreated | 13 |
| Treated | 40 |
| Percent increase | 208 |

*Example II*

A sample of calcined gamma-alumina pellets was prepared by gelling a Heard-type alumina hydrosol, drying, calcining, crushing, lubricating with Sterotex, pelleting, and again calcining. Average crushing strength of the resulting pellets was found to be about 8 pounds.

A portion of the alumina pellets were soaked in concentrated aqueous ammonium hydroxide solution containing about 25 percent by weight of NH₃. Sufficient PtCl₂ was added to raise the platinum content of the final preparation to about 0.7 weight percent platinum. The immersed pills were placed in a furnace at about 200° F. for about 16 hours, following which they were calcined at about 1100° F. for about 6 hours. Crushing strength of the treated pellets was found to be 36 pounds, an increase of 450 percent. Since impregnation with PtCl₂ alone has no significant effect on crushing strength, the improvement resulted from the treatment in accordance with our invention.

*Example III*

The following series of tests demonstrate the effectiveness of our invention in the treatment of calcined gamma-alumina pellets, in contrast with other forms of alumina and with composites of limited gamma-alumina content. Except for composite D in the following table, all of calcined composites prior to treatment contained a small amount of platinum (less than about 1 percent by weight). In each case crushing strength of about 25 pellets was determined with and without treatment in accordance with our invention. In each case the pellets were covered with an excess of concentrated aqueous NH₃ solution, placed in an oven at about 225° F. for about 16 hours, and then calcined for about 2 hours at 1000° F.

Results are summarized in the following table:

| Composite | Alumina Phase | Average Crushing Strength, Pounds | | |
|---|---|---|---|---|
| | | Untreated | Treated | Percent Increase |
| A | Gamma | 12 | 27 | 125. |
| B | ---do--- | 11 | 33 | 200. |
| C | Gamma + 0.5% Alpha | 12 | 11 | Not Substantial. |
| D | Gamma + 75% Silica | 17 | 19 | Do. |
| E | Eta | 13 | 12 | Do. |
| F | ---do--- | 12 | 14 | Do. |
| G | ---do--- | 13 | 11 | Do. |
| H | Chi | 10 | 9 | Do. |

Catalysts A and B are typical calcined gamma-alumina composites prepared in essentially the same manner as described in Example I. In each case crushing strength was increased by more than 100 percent. Catalyst C is the same catalyst as catalyst B except that it had been used for a number of months in the hydroforming of a petroleum naphtha, during which period 0.5 percent alpha alumina was formed. When treated in accordance with our invention no improvement in crushing strength was obtained. Catalyst D was a so-called "high-alumina" silica-alumina cracking catalyst in which the gamma-alumina content was about 25 percent and the silica content was about 75 percent. When treated in accordance with our invention no substantial improvement in crushing strength was obtained. In composites E, F, and G the alumina was present in the eta phase. Again no substantial improvement in crushing strength was obtained. The alumina in catalyst H was present in the chi phase. Here also, no substantial improvement in crushing strength was obtained.

The treated alumina obtained from our process is suitable per se as a catalyst for various processes, such as the dehydration of alcohols, the reaction of methanol and ammonia to produce methylamines, the vapor-phase finishing of synthetic gasolines, and the like. The alumina is also a highly satisfactory support for various other catalytic materials, such as molybdena, chromia, platinum, nickel, and the like. The addition of such other substances to our treated alumina is conveniently carried out before, during or after our treatment, preferably before, according to the techniques described in the art.

Such high-strength pellets are broadly useful for the conversion of hydrocarbons, e.g., reforming, isomerization, hydrogenation, hydrocracking, dehydrogenation, and other reactions known in the art. The required processing conditions depend upon the specific reactions, the charging stocks involved, and the presence or absence of other catalytic materials, and may readily be determined from the teachings of the prior art. Our catalyst, when containing 0.01 to 1 weight percent platinum, based on dry $Al_2O_3$, is especially advantageous in the hydroforming of petroleum naphthas boiling in the range of about 200 to 400° F. Such naphthas are suitably contacted in the vapor phase with the catalyst at a temperature between about 800 and 1000° F., a pressure between about 100 and 1000 pounds per square inch gage, an hourly weight space velocity between about 0.5 and 10, and a hydrogen recycle rate between about 2,000 and 10,000 standard cubic feet per barrel of charging stock.

While we have described our invention with reference to certain specific examples in the operating embodiments, it is to be understood that such embodiments are illustrative only and not by way of limitation. Numerous additional embodiments of the invention will be apparent from the foregoing description to those skilled in the art.

In accordance with the foregoing description, we claim as our invention:

1. A method for preparing alumina pellets having increased crushing strength which comprises immersing calcined alumina pellets, said pellets being predominantly gamma alumina and substantially free of alpha alumina, in a solution of an alkaline substance having a pH in the range of about 8 to 12 and an ionization constant less than about $10^{-2}$ at 25° C. for a period in excess of about 0.5 hour at a temperature in excess of about 150° F., and calcining the resulting pellets at a temperature between about 600 and 1400° F.

2. The method of claim 1 wherein said alkaline substance is a water-soluble amine.

3. The method of claim 1 wherein said alkaline substance is aqueous ammonium hydroxide.

4. The method of claim 1 wherein said calcined gamma-alumina pellets contain another catalytic material incorporated therein.

5. The method of claim 1 wherein said calcined gamma-alumina pellets contain about 0.01 to 1 weight percent platinum, based on dry $Al_2O_3$.

6. The method of claim 1 wherein the alpha alumina content is less than about 0.5 percent by weight and wherein 0.5 to 5 volumes of solution per volume of alumina are used.

7. A method for preparing alumina pellets having improved strength properties which comprises immersing calcined gamma-alumina pellets, said pellets being substantially free of alpha alumina, in an aqueous ammonia solution having a pH in the range of about 8 to 12 for about 1 to 10 hours at a temperature above about 150° F. and below the critical temperature of water, drying the immersed pellets, and calcining the dried pellets at a temperature between about 600 and 1400° F.

8. A method for preparing alumina pellets having improved crushing strength and attrition resistance which comprises calcining predominantly gamma-alumina pellets, said pellets being substantially free of alpha alumina, at a temperature of about 600 to 1400° F. for about 1 to 24 hours, immersing the calcined pellets in aqueous concentrated $NH_3$ solution for about 2 to 5 hours at a temperature above about 200° F. and below the critical temperature of water, drying the immersed pellets at about 200 to 400° F. for about 1 to 24 hours and calcining the dried pellets at about 600 to 1400° F. for about 1 to 24 hours.

References Cited in the file of this patent

UNITED STATES PATENTS

| | | |
|---|---|---|
| 2,510,189 | Nahin et al. | June 6, 1950 |
| 2,662,860 | Engel et al. | Dec. 15, 1953 |
| 2,690,433 | Engel et al. | Sept. 28, 1954 |
| 2,755,257 | Donovan et al. | July 17, 1956 |

FOREIGN PATENTS

| | | |
|---|---|---|
| 668,592 | Great Britain | May 19, 1952 |